(12) United States Patent
Sheldon

(10) Patent No.: US 7,243,966 B1
(45) Date of Patent: Jul. 17, 2007

(54) VEHICLE CARGO BED EXTENSION DEVICE

(76) Inventor: Lon Wade Sheldon, P.O. Box 444, Stonewall, OK (US) 74871

( * ) Notice: Subject to any disclaimer, the term of this patent is extended or adjusted under 35 U.S.C. 154(b) by 0 days.

(21) Appl. No.: 11/388,998

(22) Filed: Mar. 24, 2006

(51) Int. Cl.
B60P 3/40 (2006.01)
(52) U.S. Cl. ............... 296/26.08; 296/3; 224/519; 410/2; 410/3; 410/32
(58) Field of Classification Search ............ 296/3, 296/26.01, 26.03, 26.08, 26.09; 224/488, 224/511, 512, 518, 519, 522, 523, 524, 525, 224/529, 531, 532, 533, 534, 536; 410/2, 410/3, 7, 30, 32, 77, 78, 90, 91, 94, 95; 280/491.5
See application file for complete search history.

(56) References Cited

U.S. PATENT DOCUMENTS

| | | | | |
|---|---|---|---|---|
| 2,401,388 A | | 6/1946 | Striker | |
| 2,468,579 A | * | 4/1949 | Hans | 296/26.09 |
| 3,163,339 A | * | 12/1964 | Merchant | 224/503 |
| 4,856,686 A | | 8/1989 | Workentine | |
| 4,971,237 A | * | 11/1990 | Davis | 224/506 |
| 4,984,837 A | * | 1/1991 | Dise | 296/3 |
| 5,067,640 A | * | 11/1991 | Gaskill | 224/485 |
| 5,205,446 A | * | 4/1993 | Greenberg | 224/497 |
| 5,330,084 A | * | 7/1994 | Peters | 224/506 |
| 5,397,147 A | * | 3/1995 | Ducharme et al. | 280/415.1 |
| 5,433,566 A | * | 7/1995 | Bradley | 410/121 |
| 5,451,088 A | * | 9/1995 | Broad | 296/26.08 |
| 5,458,389 A | | 10/1995 | Young | |
| 5,520,315 A | * | 5/1996 | Graham | 224/521 |
| D374,645 S | * | 10/1996 | Hanson et al. | D12/162 |
| 5,615,813 A | * | 4/1997 | Ouellette | 224/405 |
| 5,649,656 A | * | 7/1997 | Davy | 224/405 |
| 5,662,254 A | * | 9/1997 | Lemajeur et al. | 224/405 |
| 5,678,743 A | * | 10/1997 | Johnson et al. | 224/485 |
| 5,695,103 A | * | 12/1997 | Duvernay et al. | 224/532 |
| 5,752,636 A | * | 5/1998 | Manley | 224/405 |
| 5,938,092 A | * | 8/1999 | Johnson | 224/521 |
| 5,950,890 A | * | 9/1999 | Darby | 224/402 |
| 5,996,869 A | * | 12/1999 | Belinky et al. | 224/510 |
| 6,039,227 A | * | 3/2000 | Stark | 224/521 |
| 6,050,627 A | * | 4/2000 | Lee | 296/26.09 |
| 6,070,926 A | | 6/2000 | Hardin | |
| 6,113,171 A | * | 9/2000 | Stearns | 296/26.08 |
| 6,129,371 A | * | 10/2000 | Powell | 280/461.1 |

(Continued)

Primary Examiner—D. Glenn Dayoan
Assistant Examiner—Paul Chenevert
(74) Attorney, Agent, or Firm—Randal D. Homburg

(57) ABSTRACT

A portable component assembly device for extending the length of the pickup bed for hauling objects longer than the bed of the pickup is adapted to the receiver hitch attached to the rear end of a pickup with a primary support bar inserted within the receiver hitch with a first upright horizontal support bar extending upward from the primary support bar beyond the tailgate to support objects up to ten feet in length with a second upright horizontal support bar connected to the primary bar having a second upright horizontal support bar extending upward from the secondary support bar to support objects longer than ten feet. Each first and second upright horizontal support bar includes a set of adjustable width anchor chocks attached to each support bar, with the second upright horizontal support bar including running lights with brake and turn indicators connected to the vehicle wiring system by a wiring harness.

7 Claims, 5 Drawing Sheets

U.S. PATENT DOCUMENTS

| | | | |
|---|---|---|---|
| 6,155,623 A * | 12/2000 | Lane | 296/26.09 |
| 6,210,087 B1 * | 4/2001 | Bacon | 410/35 |
| 6,237,823 B1 * | 5/2001 | Stewart et al. | 224/509 |
| 6,237,824 B1 * | 5/2001 | Bagley | 224/521 |
| 6,244,483 B1 * | 6/2001 | McLemore et al. | 224/521 |
| 6,386,411 B1 * | 5/2002 | Gates et al. | 224/523 |
| 6,443,474 B1 * | 9/2002 | Kay | 280/457 |
| 6,511,088 B2 | 1/2003 | Kahlstorf | |
| 6,513,690 B1 * | 2/2003 | Churchill et al. | 224/498 |
| 6,517,134 B2 * | 2/2003 | Armstrong | 296/3 |
| 6,520,473 B2 * | 2/2003 | Lee | 248/352 |
| 6,536,822 B1 * | 3/2003 | Vagedes et al. | 296/26.1 |
| 6,616,022 B1 * | 9/2003 | Naastad | 224/533 |
| 6,648,391 B1 | 11/2003 | Whiteford | |
| 6,662,983 B2 * | 12/2003 | Lane et al. | 224/405 |
| 6,752,303 B2 * | 6/2004 | McLemore et al. | 224/521 |
| 6,913,277 B2 | 7/2005 | Mrofka | |
| 7,114,896 B2 * | 10/2006 | Lantrip | 410/7 |
| 7,156,592 B1 * | 1/2007 | Cava | 410/32 |
| 2002/0036412 A1 * | 3/2002 | Bareket | 296/3 |
| 2003/0111502 A1 * | 6/2003 | DuPlantis | 224/519 |
| 2003/0184048 A1 * | 10/2003 | Bonde | 280/491.5 |
| 2004/0012170 A1 * | 1/2004 | McCoy | 280/495 |
| 2004/0245795 A1 * | 12/2004 | Hansen | 296/26.08 |
| 2006/0043133 A1 * | 3/2006 | Bair | 224/519 |
| 2007/0024074 A1 * | 2/2007 | Harrison | 296/3 |

* cited by examiner

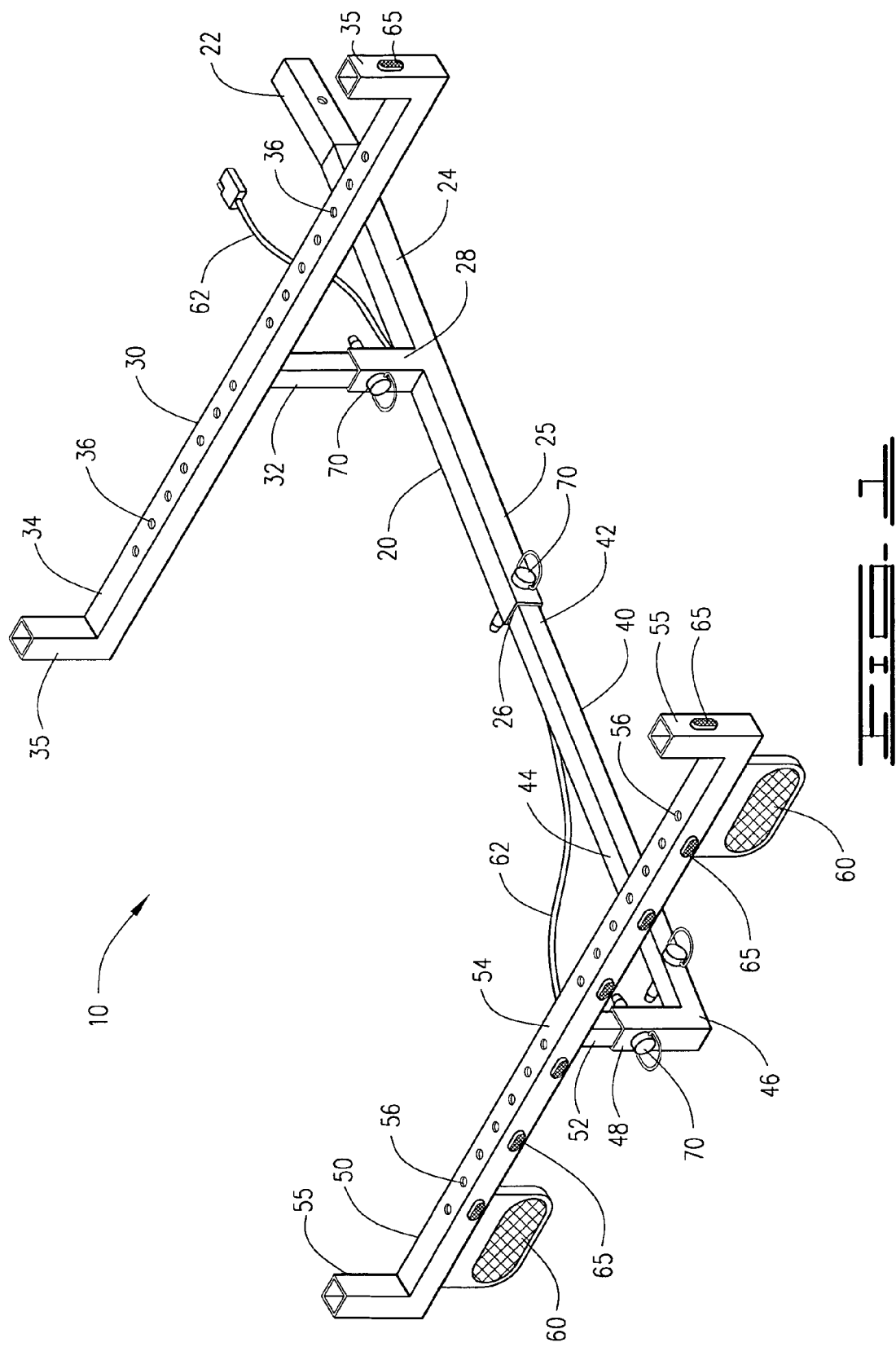

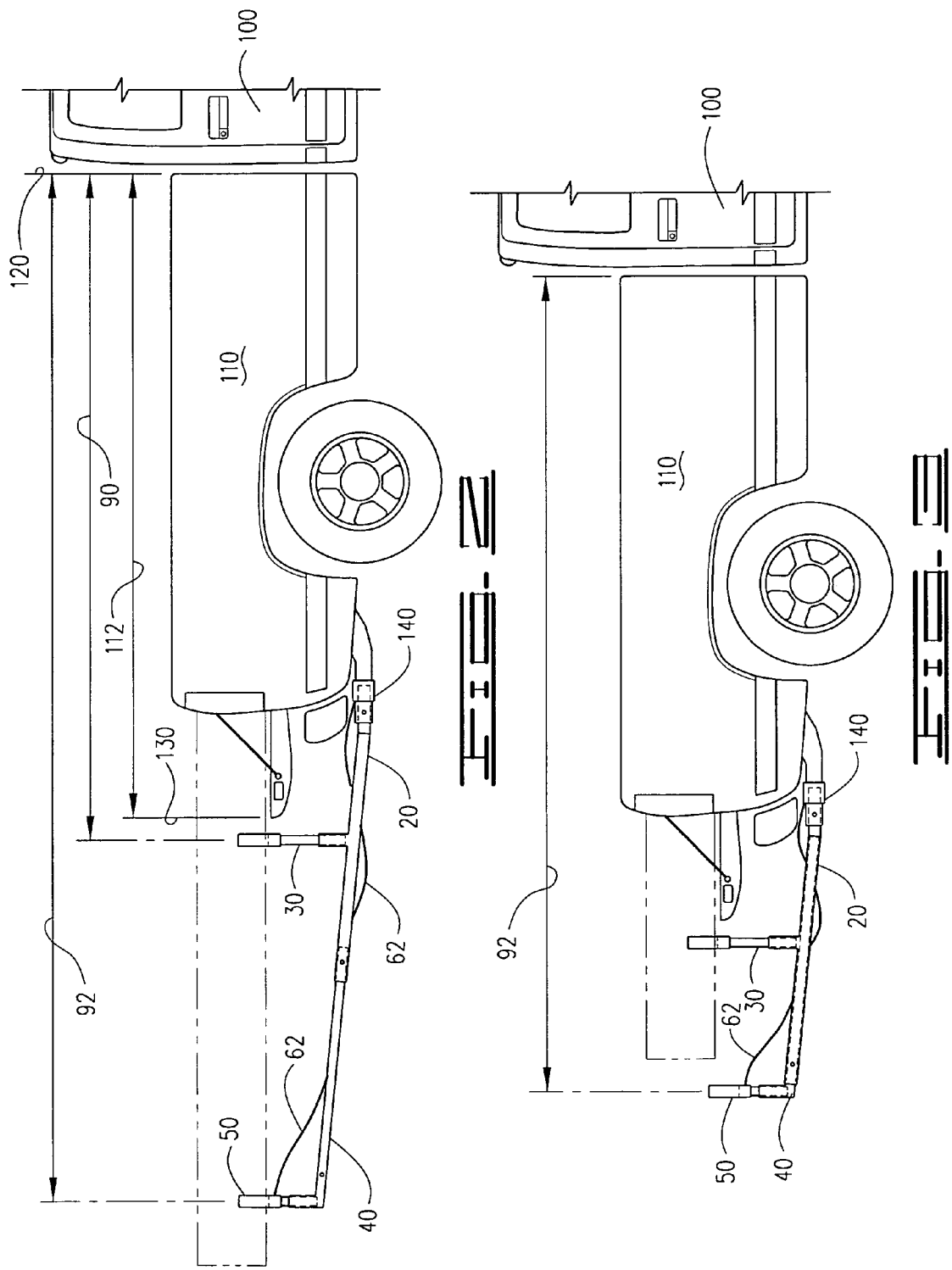

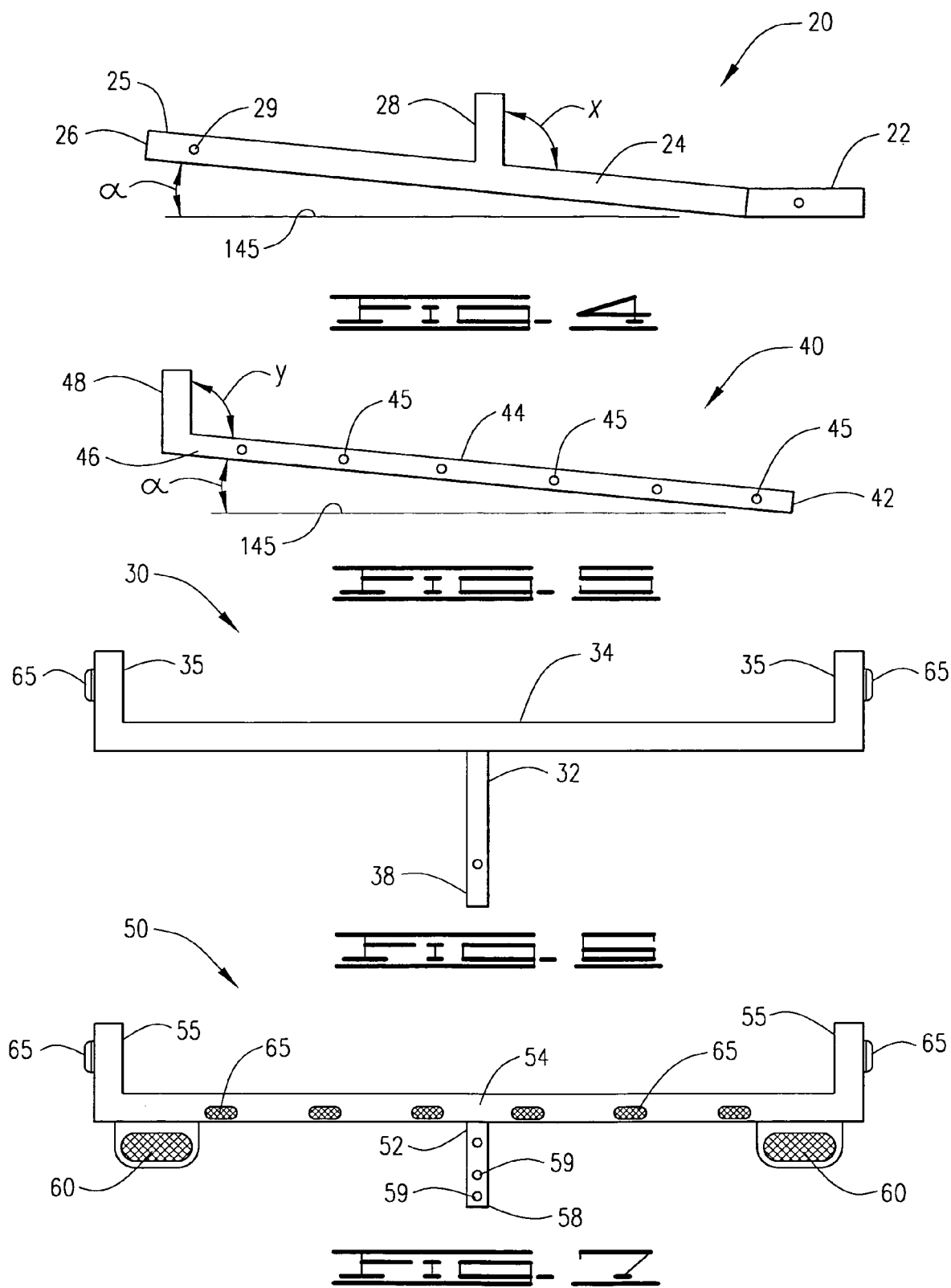

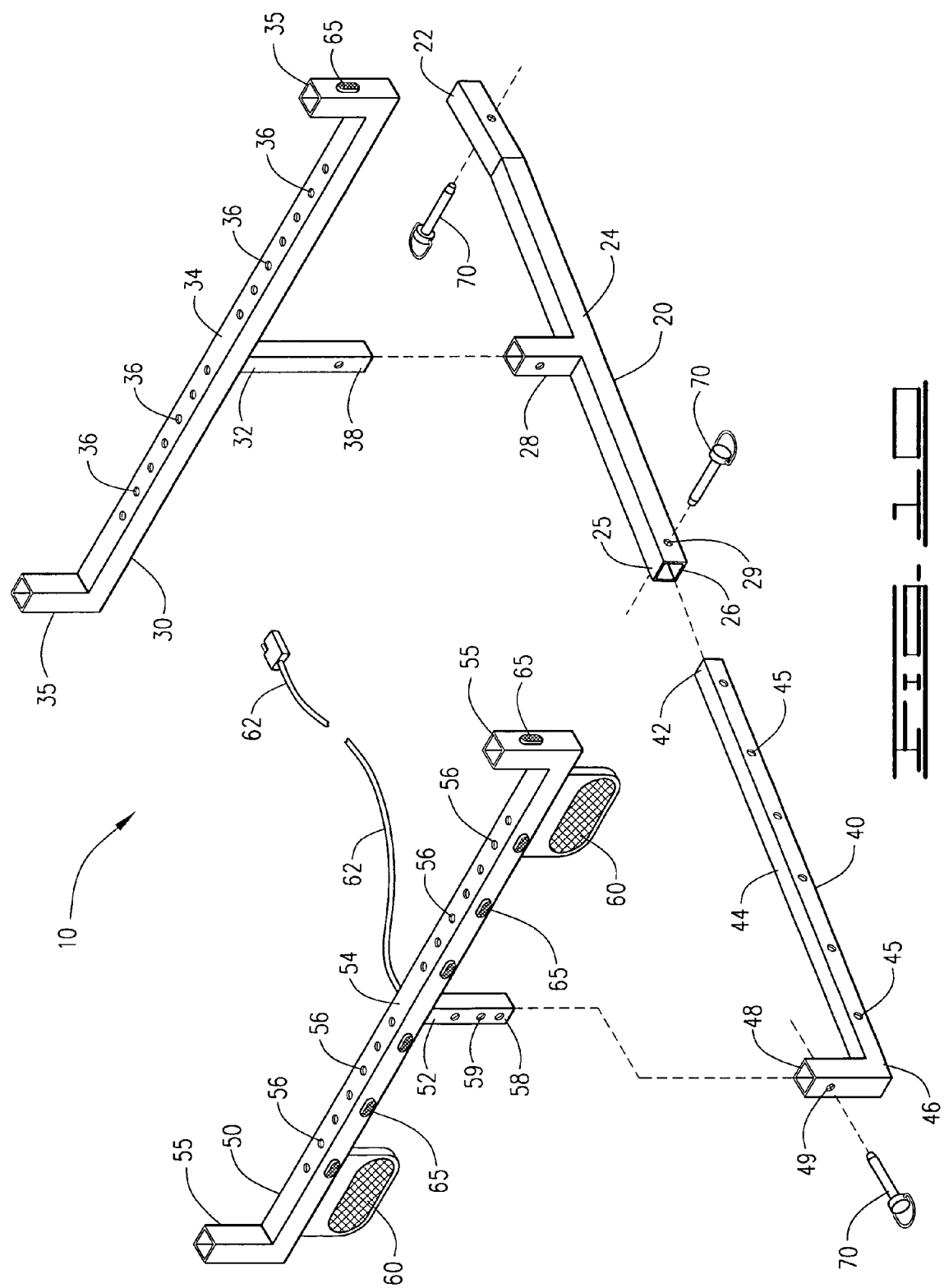

VEHICLE CARGO BED EXTENSION DEVICE

CROSS REFERENCE TO RELATED APPLICATIONS

None

I. BACKGROUND OF THE INVENTION

1. Field of Invention

An assembly device for extending the length of the pickup bed for hauling objects longer than the bed of the pickup is adapted to the receiver hitch attached to the rear end of a pickup with a primary support bar inserted within the receiver hitch with a first upright horizontal support bar extending upward from the primary support bar beyond the tailgate to support objects up to ten feet in length with a second upright horizontal support bar connected to the primary bar having a second upright horizontal support bar extending upward from the secondary support bar to support objects longer than ten feet. Each first and second upright horizontal support bar includes a set of adjustable width anchor chocks attached to each support bar, with the second upright horizontal support bar including running lights with brake and turn indicators connected to the vehicle wiring system by a wiring harness.

2. Description of Prior Art

The following United States patents were discovered and are disclosed within this application for utility patent. All relate to towing hitch extensions adapted to the receiver hitch of a vehicle.

In U.S. Pat. No. 6,648,391 to Whiteford, a cargo deck is attached to a support bar adapted to the receiver hitch. The support bar has two bent portions which position the cargo deck at a level even with the cargo bed of the vehicle, elevating the height of the cargo deck from the level of the receiver hitch to the cargo bed of the vehicle. The cargo deck is adjustable in distance from the tailgate of the cargo bed of the vehicle. It appears that an additional ball hitch extension is also attached to the support bar and light signal indicators are disclosed and incorporated into the Whiteford device.

A similar structure is disclosed in U.S. Pat. No. 6,511,088 to Kahlstorf which indicates a table top attachment with a support bar attaching the table top within the receiver hitch of the vehicle. A double support bar device attaching to a support bar inserted within the receiver hitch of a vehicle is disclosed in U.S. Pat. No. 6,070,926 to Hardin having adjustable distance upright support structures removably attach to a support bar inserted and attached to the receiver hitch, this device also disclosing a wiring harness for auxiliary signal light indicators. Each upright support structure has a height adjustment feature to raise and lower the support structures from the support bar. This upright structure attached to the support bar is also disclosed in U.S. Pat. No. 5,458,389 to Young, which shows a support bar adapted to a receiver hitch with a singular upright support bar having a means of adjusting the height of the support structure.

An extension device adapted to the receiver hitch having a curved drawbar is disclosed in U.S. Pat. No. 5,938,092 to Johnson. The drawbar curvature compensates for the height difference between the receiver hitch and the cargo bed of the vehicle, along with the variable height position of the connection between the drawbar vertical receiver and the vertical insertion end of the support structure allowing the support structure level to be even with the cargo bed of the vehicle, as indicated in FIG. 2 of that patent.

However, these prior patents, alone or in combination do not demonstrate the elements of the present tailgate extension device, which allows for an enhanced ability to carry and support long objects being transported in a vehicle having a cargo bed, adapted to both length and width of the objects to be carried in the cargo bed of the vehicle in a complete and collapsible embodiment with secure support features.

II. SUMMARY OF THE INVENTION

Pickup trucks have cargo beds used for hauling objects used for farming, ranching, construction and commercial application. As pickup trucks have evolved over the last few years, pickup beds have become shorter as passenger compartments become larger and designed to hold more passengers and for interior storage and transport. As the pickup truck beds become shorter, the ability to transport cargo of any length beyond six feet has become increasingly difficult, unless use of a trailer is employed. Often, the objects to be hauled exceed the length of the cargo bed of pickup truck and cannot be adequately secured within the pickup bed without risk of losing the cargo or creating a traffic hazard by hauling over-length objects.

As most pickup truck have some incorporated trailer attachment either provided as standard equipment or as an after-market accessory, most often provided as a receiver hitch mounted to the frame at the rear of the pickup truck. Several prior art devices have attempted to provide devices which reduce the risk of losing the object being hauled by providing an extension to the length of the cargo bed.

The present device provides a primary support bar which has a first end secured within the receiver hitch of the pickup truck below the cargo bed. This first end connects to the primary support bar at an angle directing the support bar at an upward angle from the receiver hitch. The primary support bar has a second end with an upright primary receiver within which is inserted a first upright support member having a crossbar support bar which is positioned at a level even with the floor of the cargo bed, extending the distance from the pickup cab to approximately eight to ten feet of support length. The second end also includes a secondary support member receiver within which is placed an extendable telescopic secondary support bar, the secondary support bar having an upright secondary receptacle within which is inserted a second upright support member having a crossbar support bar, also positioned at a level even with the floor of the cargo bed, further extending the distance from the pickup cab to approximately twelve to fifteen feet.

When hauling objects in the cargo bed of the pickup, the majority of the weight of the object being hauled should lie within the cargo bed of the pickup truck to maintain the object within the cargo bed. A six foot pickup bed would allow an object less than twelve feet to remain in the cargo bed if the weight was evenly distributed along the length of the object being hauled. With the first upright support member at eight feet, a sixteen foot object with an even weight distribution may be hauled. With the second upright support member installed at fifteen feet or the maximum length, an object up to thirty feet could be hauled in the cargo bed with the two upright support members supporting the weight of the object and providing additional locations for securing the object.

The primary objective of the device is to provide a secure means of hauling long objects in the cargo bed of the pickup. A second objective is to provide the device in a component structure for assembly based upon the need of the user and dependant upon the length and weight distribution of the object being hauled.

III. DESCRIPTION OF THE DRAWINGS

The following drawings are submitted with this utility patent application.

FIG. 1 is a perspective view of the device.

FIG. 2 is a side view of the device attached to the receiver hitch of a vehicle indicating the length of the first and second upright support members, with phantom lines indicating the cargo positioned upon the device extending from the rear of the vehicle from the cargo bed, with the secondary support bar in a fully extended position within the secondary support receptacle of the primary support bar.

FIG. 3 is a side view of the device attached to the receiver hitch of a vehicle indicating the length of the first and second upright support members, with phantom lines indicating the cargo positioned upon the device extending from the rear of the vehicle from the cargo bed, with the secondary support bar in a fully retracted position within the secondary support receptacle of the primary support bar.

FIG. 4 is a side view of the primary support bar showing a horizontal line aligned with the receiver hitch.

FIG. 5 is a side view of the secondary support bar showing a horizontal line aligned with the receiver hitch.

FIG. 6 is a view of the first upright support member.

FIG. 7 is a rear view of the second upright support member indicating the lights attached to the second upright support member.

FIG. 8 is an upper perspective view of the second upright support member with the crossbar extension chocks and the pins aligned for attachment to the crossbar support of the second upright support member.

FIG. 9 is a rear view of the second upright support member with the chocks attached to the crossbar support of the second upright support member.

FIG. 10 is an exploded diagram of FIG. 1.

IV. DESCRIPTION OF THE PREFERRED EMBODIMENT

Figure 2:
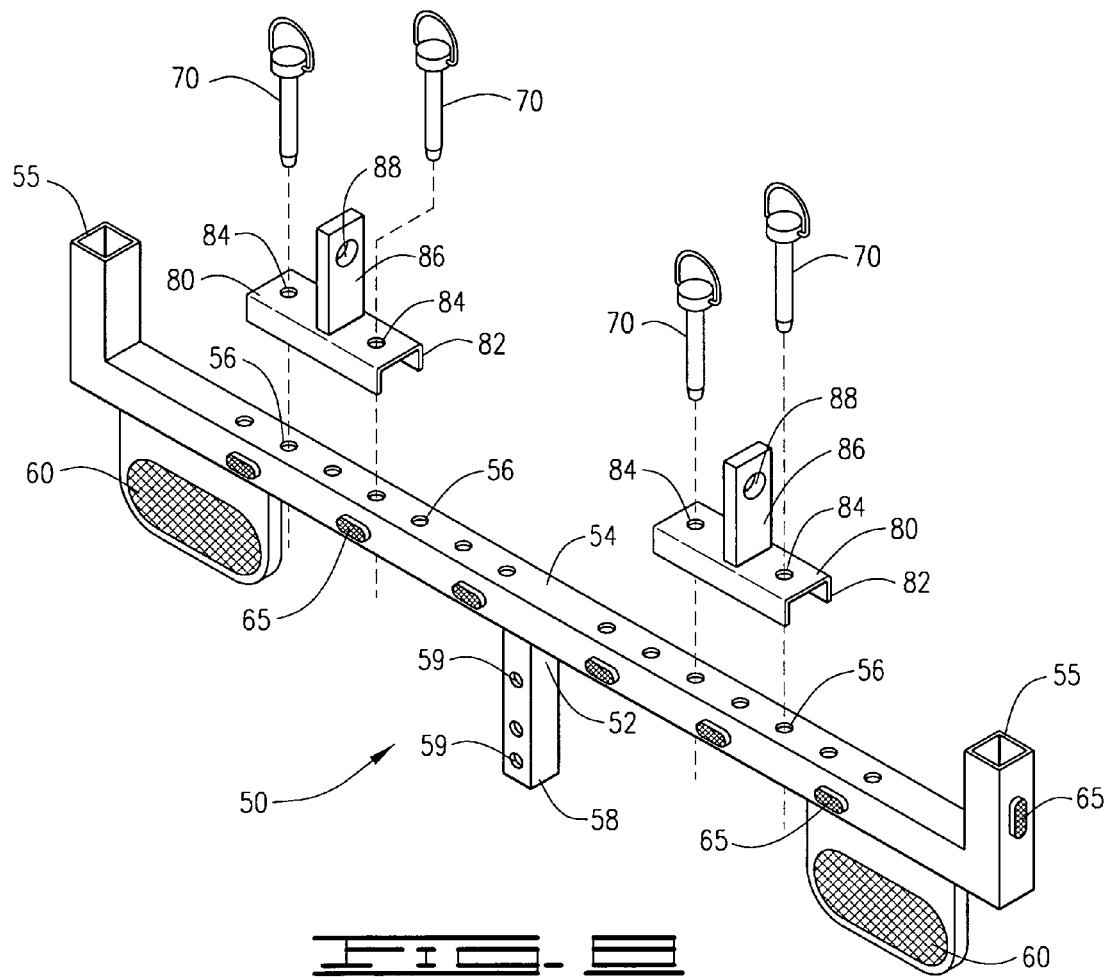

A cargo bed extension device 10, attaching within a rear-mounted receiver hitch 140 of a vehicle 100, shown in FIGS. 1-10 of the drawings, to extend the hauling capacity of objects having a length greater than a length 112 of a cargo bed 110 of the vehicle measured from a front 120 of the cargo bed to a rear 130 of the cargo bed, comprises a primary support bar 20, FIGS. 1-4 and 10, having a first end 22 adapted to be secured within the receiver hitch 140 by a pin 70, a shaft 24 attached to the first end 22 at a first angle α directed upward from the receiver hitch 140, and a second end 25, defining a secondary support receptacle 26. A first upright support member 30, FIGS. 1-3, 6 and 10, having an upper end 32 attached to a crossbar support 34 having respective end stops 35, has a lower end 38 inserted within a first upright support receiver 28 of the primary support bar 20, depending upward from the shaft 24, the lower end 38 secured within the first upright support receiver 28 by a pin 70.

A secondary support bar 40, FIGS. 1-3, 5 and 10, has a first end 42 slidably inserted within the secondary support receptacle 26 of the primary support bar 20, the secondary support bar 40 being secured within the secondary support receptacle 26 by a pin 70. The secondary support bar 40 further defines a shaft 44 and a second end 46. A second upright support member 50, 1-3 and 7-10, having an upper end 52 attached to a crossbar support 54 having respective end stops 55, has a lower end 58 inserted within a second upright support receiver 48, depending upward from the second end 46 of the secondary support bar 40, the lower end 58 secured within the second upright support receiver 48 by a pin 70.

Brake lights, signal lights, and running lights 60 are attached to the second upright support member 50 and are connected to a wiring harness 62 which is plugged into an existing trailer electrical plug of the vehicle, FIGS. 1 and 7-10. Light reflectors 65 are located on the second upright support member 50, FIGS. 1 and 7-10. Light reflectors 65 are also shown in FIGS. 1, 6 and 10 of the drawings on the first upright support member 30.

At least two crossbar extension chocks 80, FIGS. 8-9, having a channeled lower bracket 82 having a bracket hole 84 on each side of an upward projection member 86 are secured within at least two of a plurality of vertical holes 36, 56 in each crossbar support 34, 54 by a pin 70 within each bracket hole 84, each upward projection member 86 having at least one transverse aperture 88. The drawings do not show the extension chocks 80 on the crossbar support 34 of the first upright support member 30, but may be attached to the vertical holes 36 of the crossbar support 34 in the same manner as shown in FIGS. 8-9 of the drawings as the drawings demonstrate as applied to the crossbar support 54 of the second upright support member 50.

Figure 3:
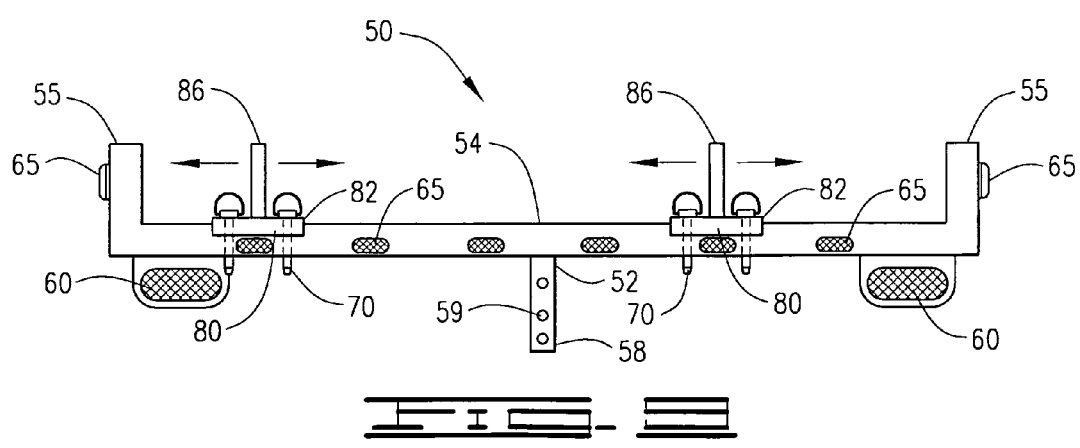

The first upright support member 30 is positioned at a first length 90 from the front 120 of the cargo bed 110 beyond the rear 130 of the cargo bed 110, while the second upright support member 50 is positioned at a second length 92 from the front 120 of the cargo bed 110 beyond the rear 130 of the cargo bed 110 and further beyond the first length 90 of the first upright support member 30, FIGS. 2-3. Preferably, the first length 90 would be between eight and ten feet, while the second length 92 would be between thirteen and fifteen feet.

The first end 42 of the secondary support bar 40 would preferably provide the secondary support bar 40 with an adjustable and telescoping connection with the secondary support receptacle 26 by providing the first end 42 with a plurality of transverse holes 45 and the secondary support member receptacle 26 having a single transverse bore 29 with a pin 70 inserted through the transverse bore 29 and through one of the plurality of transverse holes 45 in the first end 42 and shaft 44 of the secondary support bar 40, FIGS. 2-3.

The first angle α between the first end 22 of the primary support bar 20 and the shaft 24 is preferably a 10 degrees vertical from a horizontal line 145 aligned with the receiver hitch 140 of the vehicle, FIG. 4. This first angle α is provided to reduce the potential for the device to drag the pavement in the event of a heavy load. In conjunction, a second angle X and third angle Y, respectively defined between the first upright support member 30 and the primary support bar 20 and the second upright support member 50 and the secondary support bar 40 should be at 100 degrees to place the first and second upright support members 30, 50 vertically, or perpendicularly from the horizontal line 145 aligned with the receiver hitch 140 of the vehicle, FIGS. 4 and 5.

The crossbar support 34 of the first upright support member 30 should be positioned at the same level as the cargo bed 110, supporting an object being carried in the cargo bed 110 of the vehicle 100 with a level support base, FIGS. 2 and 3. The second upright support member 50 would preferably include a plurality of transverse bores 59 through the lower end 58, allowing for a selection of different heights of the crossbar support 54 in relationship to the cargo bed 110 and the crossbar support 34 of the first upright support member 30, depending on the load being carried on the device extending from the cargo bed of the vehicle. The second upright support receiver 48 would also include a transverse bore 49, allowing the pin 70 to be secured through the transverse bore 49 of the second upright support receiver 48 and the selected one of the plurality of transverse bores 59.

Each crossbar extension chock 80 may be located on the respective crossbar support 34, 54 in a manner which secures an object being carried on the device and prevents lateral sliding of the object carrier upon the device, the crossbar extension chocks 80 being placed on either side of the object and secured to the crossbar support 34, 54. In addition, the transverse apertures 88 of each upward projection member 86 provide a location for a rope, elastic retaining strap or other securing means to be attached or threaded to secure the object being carried on the device from movement during transport.

While the invention has been particularly shown and described with reference to a preferred embodiment thereof, it will be understood by those skilled in the art that changes in form and detail may be made therein without departing from the spirit and scope of the invention.

What is claimed is:

1. A cargo bed extension device, adapted to be secured within a rear-mounted receiver hitch of a vehicle having a cargo bed with a front and a rear, extending the hauling capacity of the cargo bed by providing support to objects extending beyond the cargo bed, the device comprising:
   a primary support bar having a first end adapted to be secured within the receiver hitch of the vehicle by a pin, a shaft attached to said first end at a first angle directed upward from the receiver hitch, and a second end, defining a secondary support receptacle;
   a first upright support member having an upper end perpendicularly attached to a first crossbar support having respective end stops and a lower end attached within a first upright support receiver depending upward from said shaft, said lower end secured within said first upright support receiver by a pin;
   a secondary support bar having a first end inserted within said secondary support receptacle of said primary shaft by a pin, said secondary support bar further having a shaft and a second end;
   a second upright support member having an upper end perpendicularly attached to a second crossbar support having respective end stops and a lower end attached within a second upright support receiver depending upward from said shaft, said lower end secured within said second upright support receiver by a pin;
   at least two crossbar extension chocks defining a channeled lower bracket having two bracket holes on each side of an upward projection member secured within at least two of a plurality of vertical spaced holes in each first and second crossbar support by pins; and
   brake lights, signal lights and running lights attached to said second upright support member, said brake lights, signal lights and running lights attaching to a wiring harness.

2. The device as disclosed in claim 1, further comprising:
   said first angle between said first end of said primary support bar and said shaft is 10 degrees vertical from a horizontal line extending from said receiver hitch of said vehicle;
   a second angle between said first upright support member and said primary support bar is 100 degrees; and
   a third angle between said second upright support member and said secondary support bar is 100 degrees, wherein said first and second upright support members are perpendicular to said horizontal line extending from said receiver hitch of said vehicle.

3. A cargo bed extension device, adapted to be secured within a rear-mounted receiver hitch of a vehicle having a cargo bed with a front and a rear, extending the hauling capacity of the cargo bed by providing support to objects extending beyond the cargo bed, the device comprising:
   a primary support bar having a first end adapted to be secured within the receiver hitch of the vehicle by a pin, a shaft attached to said first end at a first angle directed upward from the receiver hitch, and a second end, defining a secondary support receptacle;
   a first upright support member having an upper end perpendicularly attached to a first crossbar support having respective end stops and a lower end attached within a first upright support receiver depending upward from said shaft, said lower end secured within said first upright support receiver by a pin, said first crossbar support of said first upright support member located at a first length from the front of the cargo bed beyond the rear of the cargo bed at a length between eight and ten feet;
   a secondary support bar having a first end inserted within said secondary support receptacle of said primary shaft by a pin, said secondary support bar further having a shaft and a second end;
   a second upright support member having an upper end perpendicularly attached to a second crossbar support having respective end stops and a second end attached within a second upright support receiver depending upward from said shaft said lower end secured within said second upright support receiver by a pin, said second crossbar support of said second upright support member located at a second length from the front of the cargo bed beyond the rear of the cargo bed at a length between thirteen and fifteen feet;
   at least two crossbar extension chocks defining a channeled lower bracket having two bracket holes on each side of an upward projection member secured within at least two of a plurality of vertical spaced holes in each first and second crossbar support by pins; and
   brake lights, signal lights and running lights attached to said second upright support member, said brake lights, signal lights and running lights attaching to a wiring harness.

4. The device, as disclosed in claim 3, said first end of said secondary support bar having a plurality of transverse holes and said secondary support member receptacle having a single transverse bore wherein a pin is inserted through the transverse bore of said single transverse bore and one of said plurality of transverse holes in said first end of said secondary support bar, wherein said secondary support bar provides an adjustable length.

5. The device as disclosed in claim 3, further comprising:
   said first angle between said first end of said primary support bar and said shaft is 10 degrees vertical from a horizontal line extending from said receiver hitch of said vehicle;
   a second angle between said first upright support member and said primary support bar is 100 degrees; and
   a third angle between said second upright support member and said secondary support bar is 100 degrees, wherein said first and second upright support members are perpendicular to said horizontal line extending from said receiver hitch of said vehicle.

6. A cargo bed extension device, adapted to be secured within a rear-mounted receiver hitch of a vehicle having a cargo bed with a front and a rear, extending the hauling capacity of the cargo bed by providing support to objects extending beyond the cargo bed, the device comprising:

a primary support bar having a first end adapted to be secured within the receiver hitch of the vehicle by a pin, a shaft attached to said first end at a first angle directed upward from the receiver hitch, and a second end, defining a secondary support receptacle;

a first upright support member having an upper end perpendicularly attached to a first crossbar support having respective end stops and a lower end attached within a first upright support receiver depending upward from said shaft, said lower end secured within said first upright support receiver by a pin;

a secondary support bar having a first end inserted within said secondary support receptacle of said primary shaft by a pin, said secondary support bar further having a shaft and a second end;

a second upright support member having an upper end perpendicularly attached to a second crossbar support having respective end stops and a second end attached within a second upright support receiver depending upward from said shaft, said lower end secured within said second upright support receiver by a pin, said first end of said secondary support bar having a plurality of transverse holes and said secondary support member receptacle having a single transverse bore wherein a pin is inserted through the transverse bore of said single transverse bore and one of said plurality of transverse holes in said first end of said secondary support bar, wherein said secondary support bar provides an adjustable length;

at least two crossbar extension chocks defining a channeled lower bracket having two bracket holes on each side of an upward projection member secured within at least two of a plurality of vertical spaced holes in each first and second crossbar support by pins; and brake lights, signal lights and running lights attached to said second upright support member, said brake lights, signal lights and running lights attaching to a wiring harness.

7. The device as disclosed in claim 6, further comprising:

said first angle between said first end of said primary support bar and said shaft is 10 degrees vertical from a horizontal line extending from said receiver hitch of said vehicle;

a second angle between said first upright support member and said primary support bar is 100 degrees; and a third angle between said second upright support member and said secondary support bar is 100 degrees, wherein said first and second upright support members are perpendicular to said horizontal line extending from said receiver hitch of said vehicle.

* * * * *